(12) United States Patent
Bon Saint Come et al.

(10) Patent No.: US 10,571,610 B2
(45) Date of Patent: Feb. 25, 2020

(54) INFRA-RED CONTROL OPTICAL FILMS HAVING METAL NITRIDE BETWEEN ENCAPSULATING LAYERS CONTAINING OXIDE

(71) Applicant: SAINT-GOBAIN PERFORMANCE PLASTICS CORPORATION, Solon, OH (US)

(72) Inventors: Yemima Anne Bon Saint Come, Paris (FR); Laura Jane Singh, Paris (FR); Camille Joseph, Paris (FR)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 165 days.

(21) Appl. No.: 14/948,007

(22) Filed: Nov. 20, 2015

(65) Prior Publication Data

US 2016/0146990 A1 May 26, 2016

(30) Foreign Application Priority Data

Nov. 21, 2014 (FR) ..................................... 14 02625

(51) Int. Cl.
*G02B 5/20* (2006.01)
*G02B 5/22* (2006.01)
(Continued)

(52) U.S. Cl.
CPC ........ *G02B 5/208* (2013.01); *B32B 17/10229* (2013.01); *C03C 17/366* (2013.01);
(Continued)

(58) Field of Classification Search
CPC ........ B32B 17/10174; B32B 17/10201; B32B 17/1022; B32B 17/10229; B32B 17/10431; B32B 17/10449; B32B 2307/42; C03C 17/36; C03C 17/3602; C03C 17/3607; C03C 17/3613; C03C 17/3626;
(Continued)

(56) References Cited

U.S. PATENT DOCUMENTS

| 5,514,454 A | 5/1996 | Boire et al. |
| 5,618,579 A | 4/1997 | Boire et al. |

(Continued)

FOREIGN PATENT DOCUMENTS

| CN | 1474788 A | 2/2004 |
| CN | 102834258 A | 12/2012 |

(Continued)

OTHER PUBLICATIONS

International Search Report issued in PCT Application No. PCT/US2015/061978 dated Mar. 2, 2016, 1 page.
(Continued)

*Primary Examiner* — Ryan S Dunning
(74) *Attorney, Agent, or Firm* — Abel Schillinger, LLP; Alexander H. Plache

(57) ABSTRACT

An infrared (IR) control composite film can have an IR control composite stack which can synergistically improve and provide tailorability to the optical properties and solar properties of the composite film. The IR control composite stack can include a first IR control layer contacted by first and second encapsulation layers.

20 Claims, 3 Drawing Sheets

(51) Int. Cl.
    *C03C 17/36* (2006.01)
    *G02B 5/28* (2006.01)
    *B32B 17/10* (2006.01)
(52) U.S. Cl.
    CPC ...... *C03C 17/3613* (2013.01); *C03C 17/3626* (2013.01); *C03C 17/3681* (2013.01); *G02B 5/22* (2013.01); *G02B 5/281* (2013.01)
(58) Field of Classification Search
    CPC ............ C03C 17/3639; C03C 17/3642; C03C 17/3649; C03C 17/3657; C03C 17/366; C03C 17/3681; G02B 5/208; G02B 5/22–286
    USPC .................. 252/582, 587, 588; 264/1.7, 1.9; 359/350, 359, 360, 361, 577, 580, 582, 359/584–591
    See application file for complete search history.

(56) References Cited

U.S. PATENT DOCUMENTS

| | | | |
|---|---|---|---|
| 5,652,046 A | 7/1997 | Beaufays et al. | |
| 5,691,044 A | 11/1997 | Oyama et al. | |
| 5,956,175 A | 9/1999 | Hojnowski | |
| 5,960,606 A | 10/1999 | Dlubak | |
| 6,114,043 A | 9/2000 | Joret | |
| 6,218,018 B1 | 4/2001 | McKown et al. | |
| 6,355,334 B1 | 3/2002 | Rondeau et al. | |
| 6,416,872 B1* | 7/2002 | Maschwitz | B32B 17/10174 428/469 |
| 6,707,610 B1 | 3/2004 | Woodward et al. | |
| 6,716,532 B2 | 4/2004 | Neuman et al. | |
| 6,852,419 B2 | 2/2005 | Stachowiak | |
| 7,241,506 B2 | 7/2007 | Hartig | |
| 7,709,095 B2 | 5/2010 | Persoone et al. | |
| 7,894,120 B2 | 2/2011 | Valentin et al. | |
| 7,910,628 B2 | 3/2011 | Mercando et al. | |
| 8,502,066 B2 | 8/2013 | Krasnov | |
| 9,354,368 B2 | 5/2016 | Mauvernay et al. | |
| 9,546,108 B2 | 1/2017 | Rondeau et al. | |
| 2002/0090507 A1 | 7/2002 | Barth et al. | |
| 2002/0192473 A1 | 12/2002 | Gentilhomme et al. | |
| 2003/0180547 A1 | 9/2003 | Buhay et al. | |
| 2004/0137234 A1 | 7/2004 | Stachowiak | |
| 2005/0008852 A1* | 1/2005 | Hartig | C03C 17/36 428/336 |
| 2006/0141265 A1 | 6/2006 | Russo et al. | |
| 2006/0154049 A1 | 7/2006 | Padiyath et al. | |
| 2007/0036989 A1 | 2/2007 | Medwick et al. | |
| 2007/0048519 A1 | 3/2007 | Anderson et al. | |
| 2009/0047466 A1 | 2/2009 | German et al. | |
| 2009/0237782 A1 | 9/2009 | Takamatsu | |
| 2010/0062242 A1 | 3/2010 | De Meyer et al. | |
| 2012/0177899 A1 | 7/2012 | Unquera et al. | |
| 2013/0155496 A1 | 6/2013 | Mauvernay et al. | |
| 2013/0260139 A1 | 10/2013 | Kamada et al. | |
| 2014/0063582 A1 | 3/2014 | Gross et al. | |
| 2014/0101919 A1* | 4/2014 | Van Nutt | B32B 15/08 29/428 |
| 2016/0082697 A1* | 3/2016 | Hara | G02B 5/287 428/212 |

FOREIGN PATENT DOCUMENTS

| | | |
|---|---|---|
| CN | 103383472 A | 11/2013 |
| CN | 103429548 A | 12/2013 |
| EP | 1218307 B1 | 7/2008 |
| JP | 2009505871 A | 2/2009 |
| KR | 20090017402 A | 2/2009 |
| TW | 201139313 A | 11/2011 |
| TW | 201226175 A | 7/2012 |
| WO | 1990008334 A1 | 7/1990 |
| WO | 0121540 A1 | 3/2001 |
| WO | 2008036358 A2 | 3/2008 |
| WO | 2008036363 A2 | 3/2008 |
| WO | 2008091385 A2 | 7/2008 |
| WO | 2009029466 A1 | 3/2009 |
| WO | 2011109306 A2 | 9/2011 |
| WO | 2014185518 A1 | 11/2014 |
| WO | 2015023137 A1 | 2/2015 |

OTHER PUBLICATIONS

International Search Report for PCT/US2015/049985, dated Dec. 11, 2015, 1 page.
Buonsanti et al. "Tunable infrared absorption and visible transparency of colloidal aluminum-doped zinc oxide nanocrystals," Nanoleters, 2011, 4706-4710.

* cited by examiner

INFRA-RED CONTROL OPTICAL FILMS HAVING METAL NITRIDE BETWEEN ENCAPSULATING LAYERS CONTAINING OXIDE

CROSS-REFERENCE TO RELATED APPLICATIONS

This application claims priority under 35 U.S.C. § 119 (a)-(d) to French Patent Application No. 1402625 entitled "INFRA-RED CONTROL OPTICAL FILM," by Yemima Anne BON SAINT COME et al., filed Nov. 21, 2014, which is assigned to the current assignee hereof and incorporated herein by reference in its entirety.

FIELD OF THE DISCLOSURE

The present disclosure relates to composite films, and more particularly to, infra-red controlling and optically transparent composite films.

RELATED ART

Composites that control radiation in the infrared spectrum while transmitting radiation in the visible spectrum have important applications for example as coverings applied to windows in building or vehicles.

It has been known to use thin silver layers in composite films to reflect infrared radiation; however, silver layers have a low stability, low durability and poor moisture and weather resistance. Moreover, silver layers are conductive and can undesirably block electronic communications, such as mobile phone communications. Additionally, further layers that can be added to the composite to combat the disadvantages of a thin silver layer generally negatively affect other properties such as visible light transmittance, haze, and yellowing.

U.S. Pat. No. 7,709,095 describes an infra-red (IR) reflecting layered structure in which the silver containing layer is contacted by a gold metal layer and a titanium oxide dielectric layer. The layers are deposited by a sputtering technique.

Furthermore, it has also been desired to improve the optical and solar properties of composite films. However, attempts to improve solar properties, such as Total Solar Energy Rejection (TSER), hinder the optical performance, such as the visible light transmittance (VLT) and vice versa.

Accordingly, a need exists to develop alternate materials for IR control, i.e. IR reflection and IR absorption, that synergistically meet the needs of transparency and TSER, and therefore the selectivity or light to solar heat gain ratio (LSHGR). Moreover, a need exists to develop a suite of composite films can be easily modified to obtain a broad range of VLT values.

BRIEF DESCRIPTION OF THE DRAWINGS

Embodiments are illustrated by way of example and are not limited in the accompanying figures.

Figure 1:
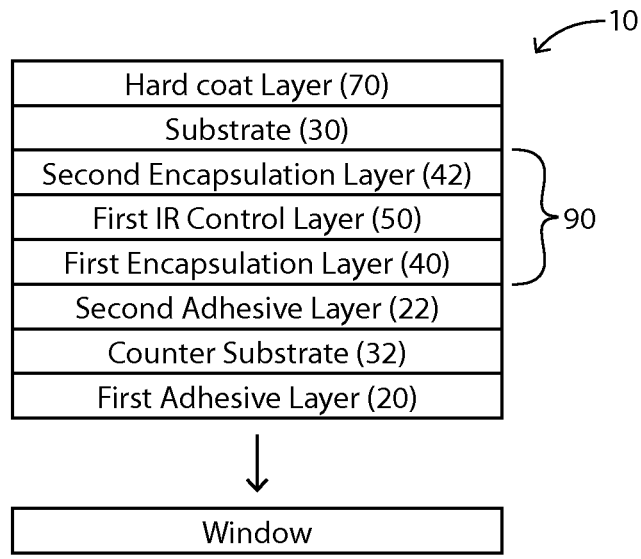
FIG. 1 includes an illustration of a composite film according to certain embodiments of the present disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the solar control film arts.

The present disclosure is directed to improved IR-absorbing composite films demonstrating, for example, a synergistic improvement in solar properties, optical properties, and production speed. Moreover, certain embodiments are able to achieve desirable performances without the need for a conductive layer, such as an IR reflective silver layer. The concepts are better understood in view of the embodiments described below that illustrate and do not limit the scope of the present invention.

FIG. 1 illustrates a representative cross section of an example composite film 10 according to certain embodiments. The composite film 10 can include a first adhesive layer 20, a counter substrate layer 32, a second adhesive layer 22, a first and second encapsulating layers 40, 42; an IR control layer 50, a substrate layer 30, and a hardcoat layer 70. It is to be understood that the composite film 10 illustrated in FIG. 1 is an illustrative embodiment. All of the layers shown are not required, and any number of additional layers, or less layers, or different arrangement of layers than shown is within the scope of the present disclosure.

The substrate layer 30 and/or counter substrate layer 32 can be composed of any number of different materials as desired for the particular application. In certain embodiments, the substrate layer 30 and/or counter substrate layer 32 can be a generally transparent layer. The substrate layer 30 and/or counter substrate layer 32 can also be generally flexible such that the composite film 10 can conform to an applied surface, such as a window. Suitable generally transparent and flexible materials can include polycarbonate, polyacrylate, polyester, such as polyethylene terephthalate (PET), cellulose triacetated (TCA or TAC), polyurethane, fluoropolymers, or combinations thereof. In particular embodiments, the substrate layer 30 and/or counter substrate layer 32 can contain polyethylene terephthalate (PET). In other particular embodiments, the substrate layer 30 and/or counter substrate layer 32 can contain polyethylene naphthalate (PEN).

In certain embodiments, the substrate layer 30 and/or the counter substrate layer 32 can include UV blockers either integrated within the substrate layer 30 and/or the counter substrate layer 32, or be made of a material which is capable of blocking a substantial amount of UV light, such as at least about 80% of UV light. For example, in certain embodiments, the IR control layer 50 can be susceptible to long term degradation from exposure to UV light, and thus, incorporating a UV blocking ability, particularly within the counter substrate can filter a large amount of UV light from reaching the IR control layer and thus preserve its longevity.

The thickness of the substrate layer 30 and/or counter substrate layer 32 can depend on the material selected and the desired application. In certain embodiments, the substrate layer 30 and/or counter substrate layer 32 can have a thickness of at least about 0.1 micrometer, at least about 1 micrometer, or even at least about 10 micrometers. In further embodiments, the substrate layer 30 and/or counter substrate layer 32 can have a thickness of no greater than about 1000 micrometers, no greater than about 500 micrometers, no greater than about 100 micrometers, or even no greater than about 50 micrometers. Moreover, the substrate layer 30 and/or counter substrate layer 32 can have a thickness in a range of any of the maximum and minimum values described above, such as, from about 0.1 micrometers to about 1000 micrometers, from about 1 micrometer to about 100 micrometers, or even, from about 10 micrometers to about 50 micrometers.

In very particular embodiments, the thickness of the substrate layer 30 can be greater than the thickness of the counter substrate layer 32. For example, in very particular embodiments, a ratio of the thickness of the substrate layer 30 to the thickness of the counter substrate layer 32 can be at least 1, at least 1.5, at least 1.75, or even at least 2.

When used as a composite film for application to a rigid surface, such as a glass window, the counter substrate layer 32 can be adapted to be disposed adjacent a surface to be covered with the film. For example, as illustrated in FIG. 1, when attached to a window, the counter substrate layer 32 can be nearer the window than the IR control layer. As such, the composite film can be a flexible, free-standing composite film which can be adapted to adhere to an architectural member or automotive member such as a glass window.

In certain embodiments, a first adhesive layer 20 can be disposed adjacent the counter substrate layer 32 and adapted to contact the surface to be covered (e.g. glass window) with the composite film 10. For example, the first adhesive layer 20 can contain an adhesive such as a laminating adhesive or pressure sensitive adhesive. In an embodiment, the adhesive layer can include polyester, acrylate, polyvinyl acetate ("PVAc"), polyvinyl butyral, polyvinyl alcohol ("PVA"), silicone rubber, another suitable adhesive, or any mixture thereof.

In certain embodiments, the composite film 10 can include a hard coat layer 70 disposed adjacent to, and in particular, directly adjacent to the substrate layer 30. The hard coat layer 70 can provide improvement in abrasion resistance, so that the substrate layer 30 is less likely to be scratched. In certain embodiments, the hard coat layer 70 can include a cross-linked acrylate, an acrylate containing nanoparticles, such as $SiO_2$ or $Al_2O_3$, or any combination thereof. The hard coat layer 70 can have any desirable thickness, such as, for example, a thickness in a range of 1 micron to 5 microns.

Referring again to FIG. 1, the composite film 10 can contain an IR control layer 50. The IR control layer 50 can provide the composite film 10 with the ability to absorb infra-red radiation, and reduce the amount of radiation that is transferred through the composite.

In certain embodiments, any of the one or more infrared absorption layers described above can contain an infrared absorption material that exhibits high absorptivity in the infrared region. In certain embodiments, any of the one or more IR control layers described herein can contain an IR absorbing metal based material. In particular embodiments, the IR absorbing metal based material can include an essentially pure IR absorbing metal, an IR absorbing metal nitride, or combinations thereof. In very particular embodiments, any of the one or more IR control layers can consist essentially of an IR absorbing metal based material, and in particular can consist essentially of an essentially pure IR absorbing metal and/or an IR absorbing metal nitride.

Suitable IR absorbing metal nitrides can include niobium nitride (NbN), titanium nitride (TiN), chromium nitride (CrN), tantalum nitride (TaN), zirconium nitride (CrN), scandium nitride (ScN), Yttrium nitride (YN), vanadium nitride (VN), Molybdenum nitride (MoN), Zirconia nitride (ZrN), hafnium nitride (HfN), or any combination thereof. Further, suitable IR absorbing metal nitrides can include metal alloy based nitrides, such as, for example, Nickel chromium nitride (NiCrN), tin zinc nitride (SnZnN), or even ternary metal alloy based nitrides. In very particular embodiments, the IR control layer can include, or even consist essentially of niobium nitride and/or titanium nitride.

Suitable essentially pure IR absorbing metals or metal alloys can include, for example, niobium (Nb), titanium (Ti), molybdenum (Mo), nickel (Ni), tin (Sn), zirconia (Zr), nickel chromium (NiCr), tin zinc (SnZn) In very particular embodiments, the IR control layer can include or even consist essentially of an essentially pure IR absorbing metal or metal alloy comprising niobium and/or titanium. When a nitride based material, such as a metal nitride, is used for an IR control layer, the IR control layer can have a desired nitrogen content. For example, in certain embodiments, the IR control layer can have a nitrogen content of at least about 1 atomic %, at least about 5 atomic %, at least about 8 atomic %, at least about 10 atomic %, at least about 15 atomic %, at least about 20 atomic %, or even at least about 25 atomic %. In further embodiments, the IR control layer can have a nitrogen content of no greater than about 60%, no greater than about 50 atomic %, no greater than about 45 atomic %, no greater than about 40 atomic %, no greater than about 35 atomic %, or even no greater than about 30 atomic %. In still further embodiments, the IR control layer can have a nitrogen content within a range of any of the minimums and maximums provided above, such as in a range of 1 atomic % to 50 atomic %, or even 10 atomic % to 45 atomic %. It is to be understood that the desired nitrogen content will depend on the other component in the nitride based layer, such as a metal. For example, if Niobium (Nb) is used as the metal, and the IR control layer contained Niobium nitride (NbN), the nitrogen content can be expressed stoichiometricly under the formula $NbN_x$, where x is between 0 and 3, between 0 and 2.5, or even between 0 and 1.5.

Figure 2:
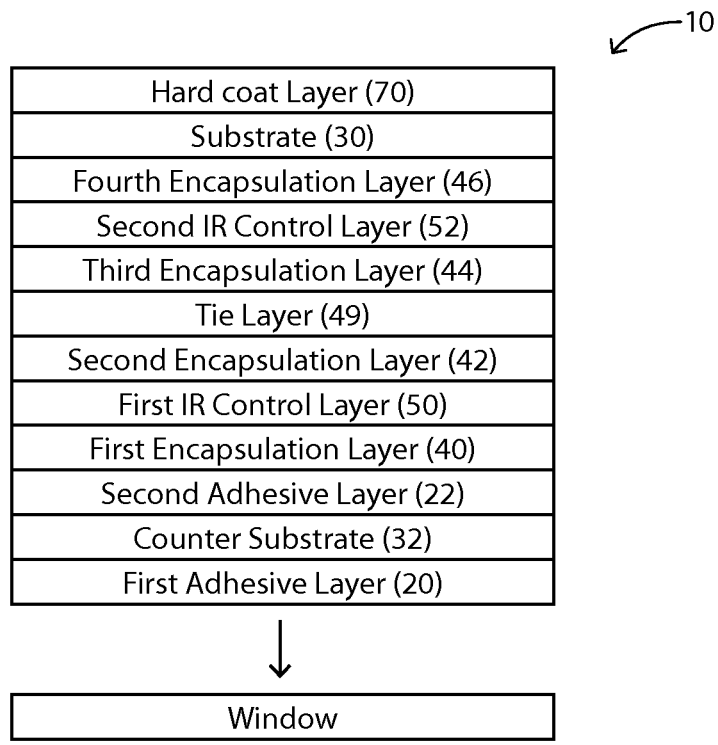
FIG. 2 includes an illustration of a composite film according to certain embodiments of the present disclosure.
Figure 3:
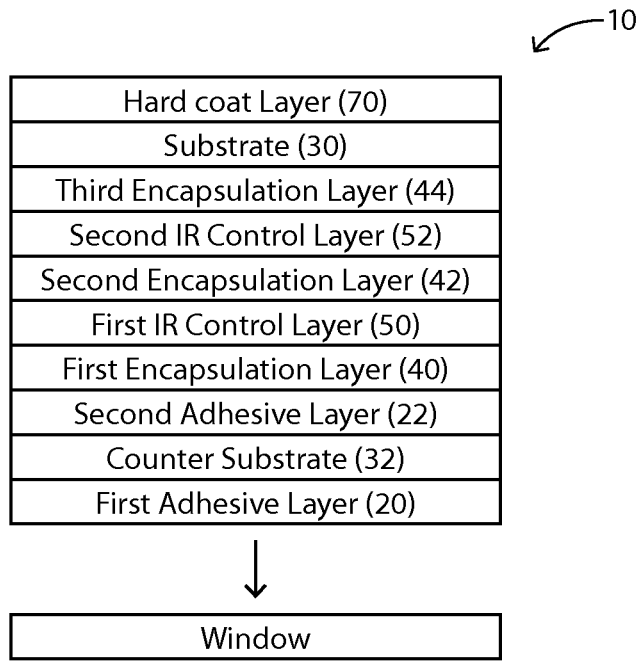
FIG. 3 includes an illustration of a composite film according to certain embodiments of the present disclosure.

In certain embodiments, as particularly illustrated in FIG. 2, the composite film 10 can contain more than one IR control layer, such as a first IR control layer 50 and a second IR control layer 52. In certain embodiments, when two or more IR control layers are present, each additional IR control layer can have one or more encapsulating layers that directly contacts the major surfaces of each IR control layer. For example, as illustrated in FIG. 2, in certain embodiments, the composite film 10 can include a second IR control layer 52 which can be in direct contact with a third encapsulating layer 44 and a fourth encapsulating layer 46. In such embodiments, the third and fourth encapsulating layers 44, 46 can be separated by a tie layer 49 to improve adhesion of the layers. In other embodiments, as particularly illustrated in FIG. 3, the first and second IR control layers 50, 52 can share a common encapsulating layer, such that the first and second IR control layers 50, 52 can directly contact the second encapsulating layer 42.

Any of the one or more IR control layers discussed herein can have a thickness of at least about 1 nanometer, at least about 3 nanometers, at least about 5 nanometers, at least about 7 nanometers, or even at least about 10 nanometers. Furthermore, any of the one or more IR control layers can have a thickness of no greater than about 1000 nanometers, no greater than about 750 nanometers, no greater than about 500 nanometers, no greater than about 400 nanometers, no greater than about 300 nanometers, no greater than about 200 nanometers, no greater than about 100 nanometers, no greater than about 75 nanometers, no greater than about 50 nanometers, or even no greater than about 40 nanometers. Moreover, any of the one or more IR control layers can have a thickness in a range of any of the maximum and minimum values described above, such as from about 1 nanometers to about 200 nanometers, or even from about 3 nanometers to about 75 nanometers.

Referring again to FIGS. 3 and 4, in particular embodiments, such as when at least two IR control layers are present, the second IR control layer 52 can have a lesser or greater thickness than the first IR control layer 50. For example, a ratio of the thickness of the second IR control layer 52 to the thickness of the first IR control layer 50 can be at least about 0.25, at least about 0.5, at least about 0.75, at least about 1, at least about 1.5, at least about 2, or even at least about 3. In further embodiments, a ratio of the thickness of the second IR control layer 52 to the thickness of the first IR control layer 50 can be no greater than 10, no greater than 8, no greater than 5, no greater than 3, no greater than 2.5, or even no greater than 2. Moreover, a ratio of the thickness of the second IR control layer 52 to the thickness of the first IR control layer 50 can be in a range of any of the minimum and maximum values proved above, such as in the range of about 0.25 to about 3, or even about 1 to about 3.

In such embodiments, it is to be understood that the first IR control layer 50 is nearer the first adhesive layer 20 than the second IR control layer 52.

In particular embodiments, the composite film 10 can contain no more than 3 IR control layers, no more than 2 IR control layers, or even no more than 1 IR control layer. In very particular embodiments, the composite film 10 can contain no more than 2 IR control layers.

The IR control layer(s) can be formed by a vacuum deposition technique, for example, by sputtering or evaporation as is well understood in the art. In particular embodiments, the IR control layer(s) can be formed by a magnetron sputtering technique. In such techniques, it is understood that the layers discussed above are substantially continuous layers of IR control material. Such layers are distinct from IR particles dispersed within a coating formulation, which would not be a substantially continuous layer of an IR control material as detailed in the present disclosure.

According to various embodiments of the disclosure, the composite can further contain one or more encapsulating layers. As discussed above, in certain embodiment, one or more encapsulating layer(s) can be disposed adjacent to, or even, directly contacting one or both major surfaces of an IR control layer. For example, as illustrated in FIG. 1, in one embodiment, the composite film 10 can contain a first encapsulating layer 40 and a second encapsulating layer 42 with an IR control layer 50 disposed therebetween.

In particular embodiments, the one or more encapsulating layers can include, for example, a dielectric material and be considered a dielectric layer. In certain embodiments, the one or more encapsulating layers layers can be composed of a metal oxide. Suitable metal oxides can include aluminum oxide, titanium oxide, niobium oxide, $BiO_2$, PbO, zinc oxide, GZO, AZO, MgZnO, MgO, $MoO_3$, SnZnO, or combinations thereof. In very particular embodiments, the one or more encapsulating layers can be composed of a metal oxide including a titanium oxide and/or a niobium oxide.

Further, in certain embodiments, the one or more encapsulating layers can be composed of a silicon based material, such as a silicon oxide, silicon nitride, silicon alloys, or doped silicon based compounds, or combinations thereof. Examples of silicon oxide based materials can include SiO and SiON. Examples of silicon nitride based materials can include SiN. Examples of silicon alloys can include SiZrN, and examples of doped silicon based compounds can include SiO:C, SiO;Al, Si(Zr)N:Al, TiO:Si, or combinations thereof.

In certain embodiments, any of the one more or encapsulating layers, or even all of the encapsulating layers can be essentially free of silicon nitride (SiN). In other words, any of the one more ore encapsulating layers, or even all of the encapsulating layers can exclude silicon nitride (SiN). The various metal oxides listed above can also be described in terms of their refractive index. For example, titanium oxide has a refractive index of about 2.41 at 510 nm, $BiO_2$ has a refractive index of about 2.45 at 550 nanometers, and PbO has a refractive index of about 2.55 at 550 nanometers, $Nb_2O_5$ has a refractive index of about 2.4 at 550 nanometers, and ZnO has a refractive index of about 2.0 at 550 nanometers. Accordingly, in very particular embodiments, at least one of the metal oxides used as a layer in the one or more metal oxide based composite layer(s) can have a desirable refractive index. For example, at least one of the metal oxides can have a refractive index of at least about 1.4, at least about 1.5, at least about 1.6, at least about 1.7, at least about 1.8, at least about 1.9, at least about 2.0, at least about 2.1, at least about 2.2, at least about 2.3, at least about 2.4, or even at least about 2.5 at either 510 nanometers or at 550 nanometers.

Any of the one or more encapsulating layer(s) discussed herein can have a thickness of at least about 1 nanometer, at least about 2 nanometers, at least about 5 nanometers, at least about 10 nanometers, at least about 20 nanometers, or even at least about 30 nanometers. Further, any of the one or more encapsulating layer(s) can have a thickness of no greater than about 200 nanometers, no greater than about 100 nanometers, or even no greater than about 80 nanometers. Moreover, any of the one or more encapsulating layer(s) can have a thickness in a range of any of the maximum and minimum values described above, such as, from about 1 nanometers to about 200 nanometers, or even from about 50 nanometers to about 100 nanometers.

Referring again to FIG. 1, in certain embodiments, the relative thickness of the first and second encapsulating layers 40, 42 can be substantially the same, or they can be different. For example, a ratio of the thickness of the second encapsulating layer 42 to the first encapsulating layer 40 can be at least 0.05, at least 0.1, at least 0.2, at least 0.25, at least 0.5, at least 1, at least 1.25, at least 1.5, at least 1.75, or even at least 2. In further embodiments, a ratio of the thickness of the second encapsulating layer 42 to the first encapsulating layer 40 can be no greater than 15, no greater than 10, no greater than 5, no greater than about 4, or even no greater than about 3. Moreover, in still further embodiments, a ratio of the thickness of the second encapsulating layer 42 to the first encapsulating layer 40 can be in a range of any of the minimum and maximum values provided above, such as in a range of 0.25 to 4, or even 1.25 to 3. In very particular embodiments, the second encapsulating layer 42 can have a greater thickness than the first encapsulating layer 40.

The one or more encapsulating layers can be formed by a vacuum deposition technique, for example, by sputtering or evaporation, or an atomic layer deposition technique. For example, the encapsulating layers can be produced by DC magnetron sputtering using rotatable ceramic metal oxide targets. These targets can have enough electrical conductivity to be used as cathodes in a DC magnetron sputtering process.

The combination of an IR control layer disposed between two encapsulating layers is also referred to herein as an IR control composite stack. Accordingly, in certain embodiments, the composite film can contain one or more IR control composite stack(s). For example, referring to FIG. 1, the IR control composite stack 90 includes the first encapsulating layer 40, the first IR control layer 50, and the second encapsulating layer 42. In certain embodiments, as particularly illustrated in FIG. 4, the composite film can include more than one IR control composite stack, such as a first IR control composite stack 90 and a second IR control composite stack 92. In such embodiments, any combination or sequence of encapsulating layers and IR control layers discussed above is contemplated within the scope of this disclosure.

Figure 4:
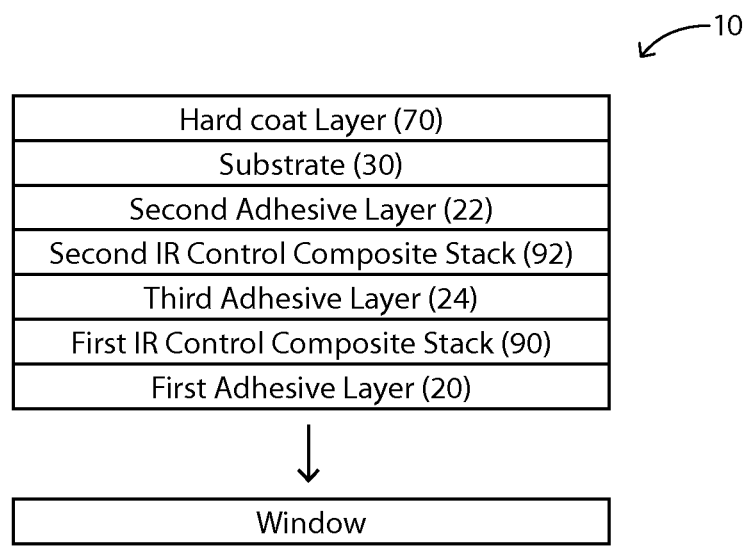
FIG. 4 includes an illustration of a composite film according to certain embodiments of the present disclosure.

For example, referring to FIG. 4, the first and/or second IR control composite stacks 90, 92 can include any of the following variations listed in Table 1 below. It is to be understood that the examples provided below are in no way limiting to the scope of the disclosure as a whole, and the specific reference to materials for the encapsulating layer and IR control layer must be understood in the context of the various possibilities of the encapsulating layer and IR control layers discussed above.

TABLE 1

| Example IR control Composite Stack 1 | Example IR control Composite Stack 2 | Example IR control Composite Stack 3 |
|---|---|---|
| Substrate NbOx NbN TiOx | Substrate NbOx NbN NbOx | Substrate TiOx NbN NbOx |

Referring again to FIG. 4, when more than one IR control composite stack is present, a third adhesive layer 24 may be disposed between the first and second IR control composite stacks 90, 92. The third adhesive layer 24 can contain any desirable adhesive, such as a laminating adhesive or pressure sensitive adhesive. In an embodiment, the adhesive layer can include polyester, acrylate, polyvinyl acetate ("PVAc"), polyvinyl butyral, polyvinyl alcohol ("PVA"), silicone rubber, another suitable adhesive, or any mixture thereof.

Figure 5:
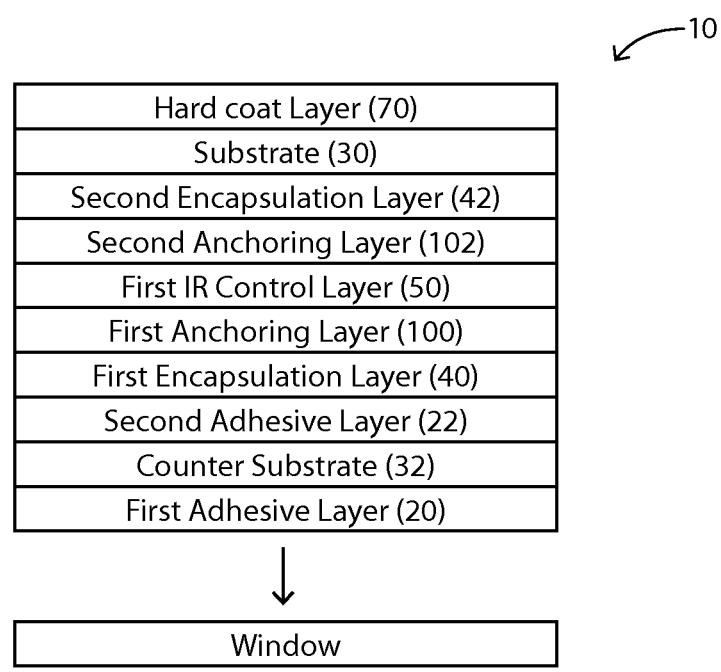
FIG. 5 includes an illustration of a composite film according to certain embodiments of the present disclosure.

Referring now to FIG. 5, in certain embodiments, the composite film 10 can further include one or more anchoring layers, such as a first anchoring layer 100 and a second anchoring layer 102. The anchoring layer can serve to improve the adhesion of an IR control layer in the composite stack, and can provide additional IR absorptive benefits. Accordingly, in certain embodiments, the composite film 10 can include one or more anchoring layers adapted to improve the adhesion with an adjacent layer, and further adapted to improve IR control.

As illustrated in FIG. 5, the first anchoring layer 100 can be disposed between the first IR control layer 50 and the first encapsulating layer 40. The second anchoring layer 102 can be disposed between the first IR control layer 50 and a second encapsulating layer 42. As such, in certain embodiments, the first and second anchoring layers 100, 102 can sandwich an IR absorbing layer, and the first and second encapsulating layers 40, 42 can sandwich the first and second anchoring layers 100, 102.

The one or more anchoring layers 100, 102 can have a low thickness. For example, in certain embodiments, any of the one more anchoring layers can have a thickness of no greater than 20 nm, no greater than 10 nanometers, no greater than 8 nanometers, no greater than 6 nanometers, no greater than 4 nanometers, or even no greater than 2 nanometers. In further embodiments, any of the one or more anchoring layers can have a thickness of at least 0.1 nanometers, at least 0.3 nanometers, or even at least 0.5 nanometers. Moreover, any of the one or more anchoring layers can have a thickness in a range of any of the minimum and maximums provided above, such as in a range of 0.1 to 10 nanometers, 0.3 to 5 nanometers, or even 0.5 to 2 nanometers.

Any of the one or more anchoring layers can be composed of, for example, a metal or a metal alloy based, and particularly, an IR absorbing metal or metal alloy based material. Suitable metals can include, for example, titanium (Ti), niobium (Nb), or combinations thereof. Suitable metal alloys can include, for example, nickel chromium (NiCr). The metal or metal alloy based material can include metal or metal alloy oxides or nitrides, such as oxides or nitrides of Ti, niobium, or chromium. In particular embodiments, the one or more anchoring layers can be essentially free of silver, or essentially free of a material which significantly reduces the sheet resistance of the composite film.

Referring again to FIG. 2 and as discussed in brief above, in certain embodiments, the composite film 10 can include a tie layer 49. Similar to the anchoring layer, the tie layer can be adapted to improve adhesion between the composite film layers and provide additional IR absorbing benefits. As illustrated in FIG. 2, the tie layer can be disposed between the first IR control layer 50 and the second IR control layer 52. In particular embodiments, the tie layer can be disposed directly adjacent encapsulating layers, such as between second encapsulating layer 42 and the third encapsulating layer 44.

The composite 10, as a whole, including all layers disposed between and including the substrate layer 30 and the outermost layer, such as the hardcoat layer 70, can have a total thickness of at least about 25 micrometers, at least about 50 micrometers, at least about 60 micrometers, or even at least about 70 micrometers. Further, the composite 10 can have a total thickness of no greater than about 300 micrometers, no greater than about 200 micrometers, no greater than about 100 micrometers, or even no greater than about 85 micrometers. Moreover, the composite 10 can have a total thickness in a range of any of the maximum and minimum values described above, such as from about 25 micrometers to about 300 micrometers, or even from about 50 micrometers to about 100 micrometers.

Particular advantages of the composite will now be described in terms of its performance. Parameters include visible light transmittance, total solar energy rejection, and sheet resistance.

Visible light transmittance (VLT) refers to the percentage of the visible spectrum (380 to 780 nanometers) that is transmitted through a composite. The visible light transmittance can be measured according to ISO 9050. In embodiments of the present disclosure, the composite can have a visible light transmittance of at least 1%, at least about 3%, at least about 5%, at least 10%, at least 15%, at least 25%, at least 35%, at least 45%, at least 55%, at least 60%, at least 65%, or even at least 70%. Further, the composite can have a visible light transmittance of no greater than 100%, no greater than 95%, no greater than 90%, no greater than 85%, no greater than 75%, no greater than 70%, no greater than 60%, no greater than 50%, no greater than 40%, no greater than 30%, no greater than 20%, or even no greater than 10%. Moreover, the composite can have a visible light transmittance in a range of any of the maximum and minimum values described above, such as in the range of from about 1% to 100%, 5% to 95%, or even 10% to 80%.

A particular advantage of the present disclosure is the ability to obtain the visible light transmittance values described herein and illustrated in the Examples below, especially in combination with the other parameters described herein. Moreover, another advantage of certain embodiments of the present disclosure is the ability to significantly vary the VLT to the desired application by, for example, adjusting the N2 content of the IR control layer and/or the thickness of the IR control layer. For example, the ability to easily vary the parameters such as VLT and TSER enables embodiments of the composite film to be produced inexpensively without significant process design changes to produce a wide variety of products.

Total Solar Energy Rejection (TSER) is a measurement of the total energy rejected by a glazing which is the sum of the solar direct reflectance and the secondary heat transfer rejection factor towards the outside, the latter resulting from heat transfer by convection and longwave IR-radiation of that part of the incident solar radiation which has been absorbed by the composite. The total solar energy rejection can be measured according to standard ISO 9050. A particular advantage of the present disclosure is the ability to obtain the total solar energy rejection values described herein and illustrated in the Examples below, especially in combination with the other parameters described herein. In particular embodiments of the present disclosure, the composite can have a total solar energy rejection of at least about 25%, at least about 30%, at least about 35%, at least about 50%, at least about 52%, at least about 55%, at least about 59%, at least about 63%, at least about 65%, at least about 70%, or even at least about 73%. Further, the composite can have a total solar energy rejection of no greater than about 90%, no greater than about 80%, no greater than about 70%, no greater than about 60%, no greater than about 50%, no greater than about 40%, or even no greater than about 30%. Moreover, the composite can have a total solar energy rejection in a range of any of the maximum and minimum values described above, such as from about 25% to about 90%, or even from about 35% to about 70%.

Sheet resistance measures the electrical resistance of thin films that are nominally uniform in thickness. Commonly, electrical resistivity is presented in units such as $\Omega \cdot cm$. To obtain a sheet resistance value, electrical resistivity is divided by the sheet thickness, and the unit can be represented as $\Omega$. To avoid being misinterpreted as bulk resistance of 1 ohm, an alternate common unit for sheet resistance is "ohms per square" (denoted "$\Omega/sq$" or "$\Omega/\square$"), which is dimensionally equal to an ohm, but is exclusively used for sheet resistance.

In certain embodiments, the composite can have a high sheet resistance, which denotes a low conductivity. A low conductivity is desired in certain embodiments of the composite films described herein, particularly when applied to an architectural or automotive member, such as a window. For example, if the conductivity of the window film is high, electronic communications, such as mobile phone communications can be impaired or blocked. Accordingly, in certain embodiments, the composite can have a sheet resistance of at least 5 Ohms/sq, at least 10 Ohms/sq, at least 25 Ohms/sq, at least 50 Ohms/sq, at least 100 Ohms/sq, at least 200 Ohms/sq, at least 300 Ohms/sq, at least 400 Ohms/sq, or even at least 500 Ohms/sq. In further embodiments, the composite film can have a sheet resistance of no greater than 3000 Ohms/sq, no greater than 2000 Ohms/sq, or even no greater than 1500 Ohms/sq. Moreover, the composite film can have a sheet resistance in a range of any of the maximum and minimum values described above, such as in the range of from 5 Ohms/sq to 2000 Ohms/sq, or from 50 Ohms/sq to 1500 Ohms/sq.

As discussed above, the sheet resistance of the composite can be proportionally related to the thickness of the IR control layer. In other words, in certain embodiments, the sheet resistance of the composite can tend to decrease as the thickness of the IR control layer increases.

Another aspect of the present disclosure is directed to a plurality of district and independent composite, also referred to as a plurality of monolithic films. The plurality of monolithic films can include, at least, a first composite film containing a first IR control stack, and a second composite film containing a second IR control stack. It is to be understood that the first and/or second IR control stacks can be any of the possibilities discussed above. In certain embodiments, the first and second IR films can be substantially the same, except the first IR control layer has a different thickness than the second IR control layer.

In particular embodiments, the difference between the VLT values of the first and second composite film can be wide, and the each of the first and second composite films can have a suitable TSER, such as a TSER of at least 20%, at least 30%, at least 40%, at least 50%, or even at least 60%.

In other particular embodiments, the second composite can have a small difference in thickness in the IR control layer from the first composite, and the second composite can exhibit a significant difference in VLT.

For example, the difference of thickness of the second IR control and the first IR control layer can be no greater than 100 nanometers, no greater than 90 nanometers, no greater than 80 nanometers, no greater than 70 nanometers, no greater than 60 nanometers, no greater than 50 nanometers, no greater than 40 nanometers, no greater than 30 nanometers, no greater than 20 nanometers, or even no greater than 15 nanometers; and the difference of visible light transmittance (VLT) of the first composite and the second composite can be at least 20%, at least 25%, at least 30%, at least 35%, or even at least 40%.

A particular advantage of certain embodiments of the present disclosure is the discovery that a small difference in the IR control layer thickness can enable the production of a wide array of VLT values. Moreover, it was particularly surprising to be able to achieve the breadth of VLT values by differing the thickness of the IR control layer by no more than about 50 nanometers. Still further, it was still even further surprising to be able to achieve the breadth of VLT values by small differences in the thickness of the IR control layer while also maintaining a satisfactory TSER across the breadth of VLT values.

In certain embodiments, the first and second composite films in the plurality of monolithic composite films can be produced using the same apparatus, such as a magnetron sputtering apparatus. In even further particular embodiments, the first and second composite films can be produced successively.

The present disclosure represents a departure from the state of the art. For example, the IR-absorbing composite described above can demonstrate a synergistic improvement and tailorability in the combination of TSER and VLT. In certain embodiments of this disclosure, the present inventors surprisingly discovered that by incorporating an IR control layer as described herein, particularly in the configuration with other layers, such as the encapsulating layers described herein, resulted in a synergistic improvement in the optical and solar properties of the composite stacks. Furthermore, the inventors surprisingly discovered a system to tailor the desired VLT and TSER by manipulating features of the IR control layer, such as thickness and nitrogen content, and selection and features of encapsulating layers, such as metal oxides including niobium oxide and titanium oxide.

EXAMPLES

Samples A-E were prepared and tested for their performance as a solar control film. In particular, the basic construction of the film samples were as sequentially follows: a PET substrate, a first dielectric (e.g. NbO), a metal nitride (e.g. NbN), and a second dielectric (e.g.NbO). Each sample was identically prepared except for the IR control layer thickness and the nitrogen content of the IR control layer. These variances of samples A-E is outlined in Table 1 below. For each of the films, the layers are deposited by magnetron deposition with the conditions outlined in Table 1 and Table 2 below:

TABLE 1

Variances in Sample Construction

| Sample | First dielectric thickness (nanometers) | NbN thickness (nanometers) | Second Dielectric Thickness (nanometers) | Nitrogen Content |
|---|---|---|---|---|
| A | 40 | 7 | 60 | High |
| B | 40 | 12 | 60 | High |
| C | 40 | 25 | 60 | High |
| D | 40 | 20 | 60 | Low |
| E | 40 | 30 | 60 | Low |

TABLE 2

Conditions for Deposition

| layer | target | power (kW) | gas | quantity of gas (sccm) |
|---|---|---|---|---|
| NbN sample A-B-C | Nb | 1 | Ar + $N_2$ | 10 (Ar) 8 (N2) |
| NbN sample D | Nb | 1 | Ar + $N_2$ | 5 (Ar) 4 (N2) |
| NbN sample E | Nb | 1 | Ar + $N_2$ | 10 (Ar) 4 (N2) |
| NbO | NbO | 2 | Ar + O2 | 15 (Ar) 14 (Ar + O2) |

The samples are then tested for the properties in the context of a solar film by the methods described above, and the results obtained are reported below in Table 3. It is noted that the samples were tested as non-laminated stacks, meaning that no counter PET was added nor was the composite adhered to glass.

TABLE 3

| Sample | Visible Light Transmittance (VLT) | Total Solar Energy Rejection (TSER) | Light to Solar Heat Gain Ratio (LSHGR) | Sheet Resistance (Ohms/sq) |
|---|---|---|---|---|
| A | >66% | >37% | 1.08 | 986 |
| B | >55% | >45% | 1.02 | 520 |
| C | >33% | >58% | 0.82 | 203 |
| D | >26% | >60% | 0.66 | 136 |
| E | >9% | >73% | 0.37 | 58 |

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below. Still further, the order in which activities are listed is not necessarily the order in which they are performed.

Item 1. A composite laminate film comprising:
  a. an IR control composite stack comprising:
    i. a first encapsulating layer;
    ii. an IR control layer comprising niobium nitride; and
    iii. a second encapsulating layer;
      wherein the IR control layer is disposed between the first and second encapsulating layers.

Item 2. A composite film comprising:
  a. an IR control composite stack comprising:
    i. a first encapsulating layer;
    ii. an IR control layer; and
    iii. a second encapsulating layer;

wherein the IR control layer is disposed between the first and second encapsulating layers; and
wherein the composite film is essentially free of a continuous silver layer, and
wherein the composite film has a VLT in a range of 5% to 90% and a TSER of no less than about 20.

Item 3. A composite film comprising:
a. an IR control composite stack comprising:
  i. a first encapsulating layer;
  ii. an IR control layer comprising niobium nitride; and
  iii. a second encapsulating layer;
b. wherein the composite film has a VLT in a range of 5% to 90% and a TSER of no less than about 20.

Item 4. A composite film comprising:
a. a first IR control composite stack comprising:
  i. a first encapsulating layer;
  ii. an IR control layer comprising niobium nitride; and
  iii. a second encapsulating layer;
    wherein the IR control layer is disposed between the first and second encapsulating layers; and
b. a second IR control composite stack comprising:
  i. a first encapsulating layer;
  ii. an IR control layer comprising a metal nitride; and
  iii. a second encapsulating layer;
    wherein the IR control layer is disposed between the first and second encapsulating layers.

Item 5. A composite film comprising:
a. a first IR control composite stack comprising:
  i. a first encapsulating layer;
  ii. an IR control layer; and
  iii. a second encapsulating layer, wherein the IR control layer is disposed between the first and second encapsulating layers;
b. a second IR control composite stack comprising:
  i. a first encapsulating layer;
  ii. an IR control layer; and
  iii. a second encapsulating layer, wherein the IR control layer is disposed between the first and second encapsulating layers
c. an anchoring layer, wherein the anchoring layer is disposed between an IR control layer and a encapsulating layer, and/or wherein the anchoring layer is disposed between the first IR control composite stack and the second IR control composite stack.

Item 6. A composite film comprising:
i. a first encapsulating layer;
ii. a first IR control layer;
iii. a second encapsulating layer, wherein the first IR control layer is disposed between the first and second encapsulating layers;
iv. a second IR control layer; and
v. a third encapsulating layer, wherein the second IR control layer is disposed between the second and third encapsulating layers;
vi. wherein the first and/or second IR control layer comprises an essentially pure IR absorbing metal and/or an IR absorbing metal nitride.

Item 7. A plurality of monolithic films comprising:
a. a first composite film comprising a first IR control stack comprising:
  i. a first encapsulating layer,
  ii. a first IR control layer having a first thickness, and
  iii. a second encapsulating layer, wherein the IR control layer is disposed between the first encapsulating layer and the second encapsulating layer,
b. a second composite film comprising a second IR control stack comprising:
  i. a third encapsulating layer,
  ii. a second IR control layer having a second thickness, and
  iii. a fourth encapsulating layer, wherein the IR control layer is disposed between the third encapsulating layer and the fourth encapsulating layer,
c. wherein the first composite film is different from the second composite film,
d. wherein the first thickness of the IR control layer is greater than the second thickness of the second IR control layer,
e. wherein the first composite film has a higher visible light transmission (VLT) than the second composite film, and
f. wherein each of the first and second composite films has a total solar energy rejection of at least about 20%.

Item 8. A plurality of monolithic films comprising:
a. a first composite film comprising a first IR control stack comprising:
  i. a first encapsulating layer,
  ii. a first IR control layer having a first thickness, and
  iii. a second encapsulating layer, wherein the IR control layer is disposed between the first encapsulating layer and the second encapsulating layer,
b. a second composite film comprising a second IR control stack comprising:
  i. a third encapsulating layer,
  ii. a second IR control layer having a second thickness, and
  iii. a fourth encapsulating layer, wherein the IR control layer is disposed between the third encapsulating layer and the fourth encapsulating layer,
c. wherein the first composite film is different from the second composite film,
d. wherein the first thickness of the first IR control layer is greater than the second thickness of the second IR control layer,
e. wherein a difference of thickness of the second IR control and the first IR control layer is no greater than 100 nanometers, and
f. wherein the difference of visible light transmission (VLT) of the first composite film and the second composite film is at least 20%.

Item 9. The composite film of any one of the preceding items, wherein the composite film comprises an IR control composite stack comprising:
  a. a first encapsulating layer,
  b. an IR control layer,
  c. a second encapsulating layer
  wherein the IR control layer is disposed between the first encapsulating layer and the second encapsulating layer.

Item 10. The composite film of any one of the preceding items, wherein the composite film comprises an IR control composite stack comprising:
  a. a first encapsulating layer,
  b. an IR control layer,
  c. a second encapsulating layer
  wherein the IR control layer is disposed between and directly contacting the first encapsulating layer and the second encapsulating layer.

Item 11. The composite film of any one of the preceding items, wherein the composite film comprises:
  a. a substrate layer; and
  b. an IR control composite stack comprising:
    i. a first encapsulating layer comprising a metal oxide,
    ii. an IR control layer comprising a metal nitride, and iii. a second encapsulating layer comprising a metal oxide
   wherein the IR control layer is disposed between the first encapsulating layer and the second encapsulating layer.

Item 12. The composite film of any one of the preceding items, wherein the composite film comprises an IR control composite stack comprising:
a. a first encapsulating layer comprising a niobium oxide and/or a titanium oxide,
b. an IR control layer comprising a metal nitride,
c. a second encapsulating layer comprising a niobium oxide and/or a titanium oxide
   wherein the IR control layer is disposed between the first encapsulating layer and the second encapsulating layer.

Item 13. The composite film of any one of the preceding items, wherein the composite film comprises an IR control composite stack comprising:
a. a first encapsulating layer comprising a niobium oxide and/or a titanium oxide,
b. an IR control layer comprising a niobium nitride and/or a titanium nitride,
c. a second encapsulating layer comprising a niobium oxide and/or a titanium oxide
   wherein the IR control layer is disposed between the first encapsulating layer and the second encapsulating layer.

Item 14. The composite film of any one of the preceding items, wherein the composite film comprises:
a. a first IR control composite stack comprising:
   i. a first encapsulating layer;
   ii. an IR control layer; and
   iii. a second encapsulating layer;
      wherein the IR control layer is disposed between the first and second encapsulating layers.
b. a second IR control composite stack comprising:
   i. a first encapsulating layer;
   ii. an IR control layer; and
   iii. a second encapsulating layer;
      wherein the IR control layer is disposed between the first and second encapsulating layers.

Item 15. The composite film of any one of the preceding items, wherein the composite film comprises:
a. a first IR control composite stack comprising:
   i. a first encapsulating layer comprising a metal oxide;
   ii. an IR control layer comprising a metal nitride; and
   iii. a second encapsulating layer comprising a metal oxide;
      wherein the IR control layer is disposed between the first and second encapsulating layers.
b. a second IR control composite stack comprising:
   i. a first encapsulating layer comprising a metal oxide;
   ii. an IR control layer comprising a metal nitride; and
   iii. a second encapsulating layer comprising a metal oxide;
      wherein the IR control layer is disposed between the first and second encapsulating layers.

Item 16. The composite film of any one of the preceding items, wherein the IR control layer is directly contacted on both major surfaces with the first encapsulating layer and the second encapsulating layer.

Item 17. The composite film of any one of the preceding items, wherein the composite film comprises more than one IR control layer.

Item 18. The composite film of any one of the preceding items, wherein any of the one or more IR control layers comprises a nitride.

Item 19. The composite film of any one of the preceding items, wherein any of the one or more IR control layers comprises a metal nitride and/or an essentially pure absorbing metal or metal alloy.

Item 20. The composite film of any one of the preceding items, wherein any of the one or more IR control layers comprises an essentially pure absorbing metal or metal alloy comprising molybdenum (Mo), nickel (Ni), tin (Sn), zirconia (Zr), nickel chromium (NiCr), tin zinc (SnZn), or combinations thereof.

Item 21. The composite film of any one of the preceding items, wherein any of the one or more IR control layers comprises a metal or metal alloy based nitride comprising niobium nitride (NbN), titanium nitride (TiN), chromium nitride (CrN), tantalum nitride (TaN),), scandium nitride (ScN), ytrrium nitride (YN), vanadium nitride (VN), Molybdenum nitride (MoN), zirconia nitride (ZrN), nickel chromium nitride (NiCrN), tin zinc nitride (SnZnN), hafnium nitride (HfN), or any combination thereof.

Item 22. The composite film of any one of the preceding items, wherein any of the one or more IR control layers comprises a metal nitride comprising niobium nitride and/or titanium nitride.

Item 23. The composite film of any one of the preceding items, wherein any of the one or more IR control layers consists essentially of a metal nitride.

Item 24. The composite film of any one of the preceding items, wherein any of the one or more IR control layers has a thickness of at least about 1 nanometers, at least about 3 nanometers, at least about 5 nanometers, at least about 7 nanometers, or even at least about 10 nanometers.

Item 25. The composite film of any one of the preceding items, wherein any of the one or more IR control layers has a thickness of no greater than about 1000 nanometers, no greater than about 750 nanometers, no greater than about 500 nanometers, no greater than about 400 nanometers, no greater than about 300 nanometers, no greater than about 200 nanometers, no greater than about 100 nanometers, no greater than about 75 nanometers, no greater than about 50 nanometers, or even no greater than about 40 nanometers.

Item 26. The composite film of any one of the preceding items, wherein any of the one or more IR control layers has a thickness in a range from about 1 nanometers to about 200 nanometers, or even from about 3 nanometers to about 75 nanometers.

Item 27. The composite film of any one of the preceding items, wherein the composite film comprises a first IR control layer and a second IR control layer and wherein a ratio of the thickness of the second IR control layer to the first IR control layer is at least about 0.25, at least about 0.5, at least about 0.75, at least about 1, at least about 1.5, at least about 2, or even at least about 3.

Item 28. The composite film of any one of the preceding items, wherein the composite film comprises a first IR control layer and a second IR control layer and wherein a ratio of the thickness of the second IR control layer to the first IR control layer is no greater than 10, no greater than 8, no greater than 5, no greater than 3, no greater than 2.5, or even no greater than 2.

Item 29. The composite film of any one of the preceding items, wherein the composite film comprises a first IR control layer and a second IR control layer and wherein a ratio of the thickness of the second IR control layer to the first IR control layer is in a range of from about 0.25 to about 3, or even from about 1 to about 3.

Item 30. The composite film of any one of the preceding items, wherein any of the one or more IR control layers has a nitrogen content of at least about 1 atomic %, at least about 5 atomic %, at least about 8 atomic %, at least about 10 atomic %, at least about 15 atomic %, at least about 20 atomic %, or even at least about 25 atomic %.

Item 31. The composite film of any one of the preceding items, wherein any of the one or more IR control layers has a nitrogen content of no greater than about 60 atomic %, no greater than about 50 atomic %, no greater than about 45 atomic %, no greater than about 40 atomic %, no greater than about 35 atomic %, or even no greater than about 30 atomic %.

Item 32. The composite film of any one of the preceding items, wherein any of the one or more IR control layers has a nitrogen content in a range of 1 atomic % to 50 atomic %, or even 10 atomic % to 45 atomic %.

Item 33. The composite film of any one of the preceding items, wherein any of the one or more IR control layer comprises a compound according to the formula $NbN_x$, where x is from 0 to 1.5.

Item 34. The composite film of any one of the preceding items, wherein any of the one or more IR control layers is a substantially continuous layer.

Item 35. The composite film of any one of the preceding items, wherein at least one IR control layer is sandwiched by a first encapsulating layer and a second encapsulating layer.

Item 36. The composite film of any one of the preceding items, wherein each IR control layer is sandwiched by a first encapsulating layer and a second encapsulating layer.

Item 37. The composite film of any one of the preceding items, wherein any of the one or more encapsulating layers comprises a metal oxide.

Item 38. The composite film of any one of the preceding items, wherein any of the one or more encapsulating layers consists essentially of a metal oxide.

Item 39. The composite film of any one of the preceding items, wherein any of the one or more encapsulating layers comprises a silicon oxide (SiO) and/or a metal oxide comprising aluminum oxide, titanium oxide, niobium oxide, $BiO_2$, PbO, zinc oxide, GZO, AZO, MgZnO, MgO, $MoO_3$, or combinations thereof.

Item 40. The composite film of any one of the preceding items, wherein any of the one or more encapsulating layers comprises a metal oxide comprising a titanium oxide and/or a niobium oxide.

Item 41. The composite film of any one of the preceding items, wherein any of the one or more encapsulating layers comprises a material having a refractive index of at least about 1.8, at least about 1.9, at least about 2.0, at least about 2.1, at least about 2.2, at least about 2.3, at least about 2.4, or even at least about 2.5 at either 510 nanometers or at 550 nanometers.

Item 42. The composite film of any one of the preceding items, wherein any of the one or more encapsulating layers has a thickness of at least about 1 nanometer, at least about 2 nanometers, at least about 5 nanometers, at least about 10 nanometers, at least about 20 nanometers, or even at least about 30 nanometers.

Item 43. The composite film of any one of the preceding items, wherein any of the one or more encapsulating layers has a thickness of no greater than about 200 nanometers, no greater than about 100 nanometers, or even no greater than about 80 nanometers.

Item 44. The composite film of any one of the preceding items, wherein any of the one or more encapsulating layers has a thickness in a range of from about 1 nanometers to about 200 nanometers, or even from about 50 nanometers to about 100 nanometers.

Item 45. The composite film of any one of the preceding items, wherein the composite film comprises a first encapsulating layer and a second encapsulating layer, wherein the first encapsulating layer is nearer a substrate layer than the second encapsulating layer, and wherein a ratio of the thickness of the second encapsulating layer to the first encapsulating layer is at least 0.25, at least 0.5, at least 1, at least 1.25, at least 1.5, at least 1.75, or even at least 2.

Item 46. The composite film of any one of the preceding items, wherein the composite film comprises a first encapsulating layer and a second encapsulating layer, wherein the first encapsulating layer is nearer a substrate layer than the second encapsulating layer, and wherein a ratio of the thickness of the second encapsulating layer to the first encapsulating layer is no greater than 5, no greater than about 4, or even no greater than about 3.

Item 47. The composite film of any one of the preceding items, wherein the composite film comprises a first encapsulating layer and a second encapsulating layer, wherein the first encapsulating layer is nearer a substrate layer than the second encapsulating layer, and wherein a ratio of the thickness of the second encapsulating layer to the first encapsulating layer is in a range of 0.25 to 4, or even 1.25 to 3.

Item 48. The composite film of any one of the preceding items, wherein the composite film comprises a first encapsulating layer and a second encapsulating layer, wherein the first encapsulating layer is nearer a substrate layer than the second encapsulating layer.

Item 49. The composite film of any one of the preceding items, wherein the composite film comprises an anchoring layer.

Item 50. The composite film of any one of the preceding items, wherein the composite film comprises an anchoring layer disposed between a first IR control composite stack and a second IR control composite stack.

Item 51. The composite film of any one of the preceding items, wherein the composite film comprises an anchoring layer disposed between an IR control layer and a encapsulating layer.

Item 52. The composite film of any one of the preceding items, wherein the composite film comprises an anchoring layer adapted to improve the adhesion between a first IR control composite stack and a second IR control composite stack.

Item 53. The composite film of any one of the preceding items, wherein the composite film comprises more than one anchoring layers.

Item 54. The composite film of any one of the preceding items, wherein the composite film comprises a first anchoring layer.

Item 55. The composite film of any one of the preceding items, wherein the composite film comprises an anchoring layer having a thickness of no greater than 20 nanometers, no greater than 10 nanometers, no greater than 8 nanometers, no greater than 6 nanometers, no greater than 4 nanometers, or even no greater than 2 nanometers.

Item 56. The composite film of any one of the preceding items, wherein the composite film comprises an anchoring layer having a thickness of at least 0.1 nanometers, at least 0.3 nanometers, or even at least 0.5 nanometers.

Item 57. The composite film of any one of the preceding items, wherein the composite film comprises an anchoring layer having a thickness in a range of 0.1 nanometers to 10 nanometers, 0.3 nanometers to 5 nanometers, or even 0.5 nanometers to 2 nanometers.

Item 58. The composite film of any one of the preceding items, wherein the composite film comprises an anchoring layer comprising an essentially pure metal or a metal alloy.

Item 59. The composite film of any one of the preceding items, wherein the composite film comprises an anchoring layer comprising an IR absorbing metal or metal alloy.

Item 60. The composite film of any one of the preceding items, wherein the composite film comprises an anchoring layer comprising titanium (Ti), niobium (Nb), nickel chromium (NiCr), or combinations thereof.

Item 61. The composite film of any one of the preceding items, wherein the composite film comprises an anchoring layer, and wherein the anchoring layer is essentially free of silver.

Item 62. The composite film of any one of the preceding items, wherein the composite film comprises a substrate layer.

Item 63. The composite film of any one of the preceding items, wherein the composite film comprises a counter substrate layer.

Item 64. The composite film of any one of the preceding items, wherein the composite film comprises a substrate layer and/or a counter substrate layer comprising a transparent material comprising a polycarbonate, a polyacrylate, a polyester, a cellulose triacetated (TCA or TAC), a polyurethane, a fluoropolymer, or combinations thereof.

Item 65. The composite film of any one of the preceding items, wherein the composite film comprises a substrate layer and/or a counter substrate layer comprising polyethylene terephthalate (PET).

Item 66. The composite film of any one of the preceding items, wherein the composite film comprises a substrate layer and/or a counter substrate layer comprising polyethylene naphthalate (PEN).

Item 67. The composite film of any one of the preceding items, wherein the composite film comprises a substrate layer and/or a counter substrate layer having a thickness of at least about 0.1 micrometer, at least about 1 micrometer, or even at least about 10 micrometers.

Item 68. The composite film of any one of the preceding items, wherein the composite film comprises a substrate layer and/or a counter substrate layer having a thickness of no greater than about 1000 micrometers, no greater than about 500 micrometers, no greater than about 100 micrometers, or even no greater than about 50 micrometers.

Item 69. The composite film of any one of the preceding items, wherein the composite film comprises a substrate layer and/or a counter substrate layer having a thickness in a range of any of the maximum and minimum values described above, such as, from about 0.1 micrometers to about 1000 micrometers, from about 1 micrometer to about 100 micrometers, or even from about 10 micrometers to about 50 micrometers.

Item 70. The composite film of any one of the preceding items, wherein the composite film comprises a substrate layer and a counter substrate layer, and wherein the thickness of the substrate layer is greater than the thickness of the counter substrate layer.

Item 71. The composite film of any one of the preceding items, wherein the composite film comprises a substrate layer and a counter substrate layer, and wherein a ratio of the thickness of the substrate layer to the thickness of the counter substrate is at least 1, at least 1.5, at least 1.75, or even at least 2.

Item 72. The composite film of any one of the preceding items, wherein the composite film comprises one or more adhesive layers.

Item 73. The composite film of any one of the preceding items, wherein the composite film comprises a first adhesive layer disposed adjacent to the substrate layer and adapted to contact a surface to be covered by the composite film.

Item 74. The composite film of any one of the preceding items, wherein the composite film comprises a first adhesive layer disposed adjacent to the substrate layer and adapted to contact a surface to be covered by the composite film, wherein the first adhesive layer comprises a pressure sensitive adhesive.

Item 75. The composite film of any one of the preceding items, wherein the composite film comprises:
a. a first adhesive layer disposed adjacent to the substrate layer;
b. a release layer disposed adjacent the first adhesive layer and opposite the substrate layer, wherein the release layer is adapted to be removed before adhering the composite film to a surface to be covered by the composite film.

Item 76. The composite film of any one of the preceding items, wherein the composite film comprises a second adhesive layer disposed between a first IR control composite stack and a substrate layer.

Item 77. The composite film of any one of the preceding items, wherein the composite film comprises a first IR control composite stack, a second IR control composite stack, and an adhesive layer disposed between the first IR control composite stack and the second IR control composite stack.

Item 78. The composite film of any one of the preceding items, wherein the composite film comprises a first IR control composite stack, a second IR control composite stack, a substrate layer disposed between the first IR control composite stack and the second IR control composite stack, and an adhesive layer disposed adjacent the first IR control composite stack, opposite the substrate layer.

Item 79. The composite film of any one of the preceding items, wherein the composite film comprises a hard coat layer.

Item 80. The composite film of any one of the preceding items, wherein the composite film comprises a hard coat layer disposed adjacent to a counter substrate layer.

Item 81. The composite film of any one of the preceding items, wherein the composite film comprises a hard coat layer comprising a cross-linked acrylate, an acrylate containing nanoparticles, such as $SiO_2$ or $Al_2O_3$, or any combination thereof.

Item 82. The composite film of any one of the preceding items, wherein the composite film comprises a hard coat layer having a thickness in a range of 1 micron to 5 microns.

Item 83. The composite film of any one of the preceding items, wherein the composite film, including all layers disposed between and including a substrate layer and an outermost layer has a total thickness of at least about 25 micrometers, at least about 50 micrometers, at least about 60 micrometers, or even at least about 70 micrometers.

Item 84. The composite film of any one of the preceding items, wherein the composite film, including all layers disposed between and including a substrate layer and an outermost layer has a total thickness of no greater than about 300 micrometers, no greater than about 200 micrometers, no greater than about 100 micrometers, or even no greater than about 85 micrometers.

Item 85. The composite film of any one of the preceding items, wherein the composite film, including all layers disposed between and including a substrate layer and an outermost layer has a total thickness in a range of from about 25 micrometers to about 300 micrometers, or even from about 50 micrometers to about 100 micrometers.

Item 86. The composite film of any one of the preceding items, wherein any of the one or more IR control composite stacks is essentially free of a silver layer.

Item 87. The composite film of any one of the preceding items, wherein the composite film is essentially free of a silver layer.

Item 88. The composite film of any one of the preceding items, wherein any solar control layer is essentially free of a silver layer.

Item 89. The composite film of any one of the preceding items, wherein any one of one or more the IR control layer and/or one or more encapsulating layers is a continuous layer.

Item 90. The composite film of any one of the preceding items, wherein any one of one or more the IR control layer and/or one or more encapsulating layers is formed by an evaporation technique.

Item 91. The composite film of any one of the preceding items, wherein any one of one or more the IR control layer and/or one or more encapsulating layers is formed by a sputtering technique.

Item 92. The composite film of any one of the preceding items, wherein the composite film has a visible light transmittance of at least 1%, at least about 3%, at least about 5%, at least 10%, at least 15%, at least 25%, at least 35%, at least 45%, at least 55%, at least 60%, at least 65%, or even at least 70%.

Item 93. The composite film of any one of the preceding items, wherein the composite film has a visible light transmittance of no greater than 100%, no greater than 95%, no greater than 90%, no greater than 85%, no greater than 75%, no greater than 70%, no greater than 60%, no greater than 50%, no greater than 40%, no greater than 30%, no greater than 20%, or even no greater than 10%.

Item 94. The composite film of any one of the preceding items, wherein the composite film has a visible light transmittance in a range of from about 1% to 100%, 5% to 95%, or even 10% to 80%.

Item 95. The composite film of any one of the preceding items, wherein the composite film has a Total Solar Energy Rejection of at least about 25%, at least about 30%, at least about 35%, at least about 50%, at least about 52%, at least about 55%, at least about 59%, at least about 63%, at least about 65%, at least about 70%, or even at least about 73%.

Item 96. The composite film of any one of the preceding items, wherein the composite film has a Total Solar Energy Rejection of no greater than about 90%, no greater than about 80%, no greater than about 70%, no greater than about 60%, no greater than about 50%, no greater than about 40%, or even no greater than about 30%.

Item 97. The composite film of any one of the preceding items, wherein the composite film has a Total Solar Energy Rejection in a range of from about 25% to about 90%, or even from about 35% to about 70%.

Item 98. The composite film of any one of the preceding items, wherein the composite film has a sheet resistance of at least 5 Ohms/sq, at least 10 Ohms/sq, at least 25 Ohms/sq, at least 50 Ohms/sq, at least 100 Ohms/sq, at least 200 Ohms/sq, at least 300 Ohms/sq, at least 400 Ohms/sq, or even at least 500 Ohms/sq.

Item 99. The composite film of any one of the preceding items, wherein the composite film has a sheet resistance of at least about 200 Ohms/sq.

Item 100. The composite film of any one of the preceding items, wherein the composite film has a sheet resistance of no greater than 3000 Ohms/sq, no greater than 2000 Ohms/sq, or even no greater than 1500 Ohms/sq.

Item 101. The composite film of any one of the preceding items, wherein the composite film has a sheet resistance in the range of from 5 Ohms/sq to 2000 Ohms/sq, or from 50 Ohms/sq to 1500 Ohms/sq.

Item 102. The composite film of any one of the preceding items, wherein the composite film has a VLT in a range of about 5% to about 90%, and wherein the composite film has a TSER of at least about 20%, at least about 25%, at least about 30%, at least about 35%, or even at least about 40%.

Item 103. The composite film of any one of the preceding items, wherein the composite film has a VLT in a range of about 25% to about 90%, and wherein the composite film has a TSER of at least about 20%, at least about 25%, at least about 30%, at least about 35%, or even at least about 40%.

Item 104. The composite film of any one of the preceding items, wherein the composite film has a VLT in a range of about 35% to about 90%, and wherein the composite film has a TSER of at least about 20%, at least about 25%, at least about 30%, at least about 35%, or even at least about 40%.

Item 105. The composite film of any one of the preceding items, wherein the composite film has a VLT in a range of about 5% to about 90%, and wherein the composite film has TSER of at least about 20%, at least about 25%, at least about 30%, at least about 35%, or even at least about 40%.

Item 106. The composite film of any one of the preceding items, wherein the composite film has a VLT in a range of about 5% to about 20%, and wherein the composite film has a TSER of at least about 50%, at least about 55%, or even at least about 60%.

Item 107. The plurality of monolithic composite films of any one of the preceding items, wherein the first and second composite films are produced using the same apparatus.

Item 108. The plurality of monolithic composite films of any one of the preceding items, wherein the first and second composite films are produced using the same sputtering apparatus.

Item 109. The plurality of monolithic composite films of any one of the preceding items, wherein the first and second composite films are produced successively.

Item 110. The plurality of monolithic composite films of any one of the preceding items, wherein the difference of thickness of the second IR control and the first IR control layer is no greater than 100 nanometers, no greater than 90 nanometers, no greater than 80 nanometers, no greater than 70 nanometers, no greater than 60 nanometers, no greater than 50 nanometers, no greater than 40 nanometers, no greater than 30 nanometers, no greater than 20 nanometers, or even no greater than 15 nanometers.

Item 111. The plurality of monolithic composite films of any one of the preceding items, wherein the difference of visible light transmission (VLT) of the first composite film and the second composite film is at least 25%, at least 30%, at least 35%, or even at least 40%.

Item 112. The composite film of any one of the preceding items, wherein any of the one or more encapsulating layers comprises a silicon based compound.

Item 113. The composite film of any one of the preceding items, wherein any of the one or more encapsulating layers comprises a silicon based compound comprising a silicon oxide based material, a silicon nitride based material, silicon alloy based materials, doped silicon based materials, or combinations thereof.

Item 114. The composite film of any one of the preceding items, wherein any of the one or more encapsulating layers comprises a silicon oxide based material.

Item 115. The composite film of any one of the preceding items, wherein any of the one or more encapsulating layers comprises a silicon oxide based material comprising silicon oxide (SiO), silicon oxynitride (SiON), Item 116. The composite film of any one of the preceding items, wherein any of the one or more encapsulating layers comprises a silicon nitride based material.

Item 117. The composite film of any one of the preceding items, wherein any of the one or more encapsulating layers comprises a silicon nitride based material comprising: silicon nitride (SiN), SiON, or combinations thereof.

Item 118. The composite film of any one of the preceding items, wherein any of the one or more encapsulating layers comprises a silicon alloy based material.

Item 119. The composite film of any one of the preceding items, wherein any of the one or more encapsulating layers comprises a silicon alloy based material comprising SiZrN.

Item 120. The composite film of any one of the preceding items, wherein any of the one or more encapsulating layers comprises a doped silicon based material.

Item 121. The composite film of any one of the preceding items, wherein any of the one or more encapsulating layers comprises a doped silicon based material comprising: SiO:C, SiO:Al, Si(Zr)N:Al, TiO:Si, or combinations thereof.

Item 122. The composite film of any one of the preceding items, wherein any of the one or more encapsulating layers comprises a nitride.

Item 123. The composite film of any one of the preceding items, wherein any of the one or more encapsulating layers comprises a nitride comprising SiN, SiON, ZrN, or combinations thereof.\

Item 124. The composite film of any one of the preceding items, wherein any of the one or more encapsulating layers comprises a metal nitride, and wherein the metal nitride in the encapsulating layer is different that a metal nitride in the IR absorbing layer.

Item 125. The composite film of any one of the preceding items, wherein the composite film is adapted to here to an automotive or architectural member.

Item 126. The composite film of any one of the preceding items, wherein the composite film is adapted to adhere to a window.

Item 127. An automotive or architectural member comprising the composite film of any one of the preceding items.

Item 128. A window comprising the composite film of any one of the preceding items.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A plurality of monolithic films comprising:
   a. a first composite film comprising a first IR control stack comprising:
      i. a first encapsulating layer comprising niobium oxide, GZO, AZO, MgZnO, MgO, $MoO_3$, SnZnO, or combinations thereof,
      ii. a first IR control layer having a first thickness and comprising a metal nitride, wherein the first IR control layer comprises niobium nitride (NbN), chromium nitride (CrN), tantalum nitride (TaN), scandium nitride (ScN), yttrium nitride (YN), vanadium nitride (VN), Molybdenum nitride (MoN), zirconia nitride (ZrN), nickel chromium nitride (NiCrN), tin zinc nitride (SnZnN), hafnium nitride (HfN), or any combination thereof, and
      iii. a second encapsulating layer comprising niobium oxide, GZO, AZO, MgZnO, MgO, $MoO_3$, SnZnO, or combinations thereof, wherein the first IR control layer is disposed between the first encapsulating layer and the second encapsulating layer, wherein the first encapsulating layer directly contacts the first IR control layer, and wherein the second encapsulating layer directly contacts the first IR control layer,
   b. a second composite film comprising a second IR control stack comprising:
      i. a third encapsulating layer,
      ii. a second IR control layer having a second thickness, and
      iii. a fourth encapsulating layer, wherein the second IR control layer is disposed between the third encapsulating layer and the fourth encapsulating layer,
   c. wherein the first composite film is different from the second composite film,
   d. wherein the first thickness of the first IR control layer is greater than the second thickness of the second IR control layer,
   e. wherein the first composite film has a higher visible light transmission (VLT) than the second composite film,
   f. wherein each of the first and second composite films has a total solar energy rejection of at least about 20%, and
   g. wherein one or both of the composite films has a sheet resistance of at least about 50 Ohms/sq.

2. The plurality of monolithic films of claim 1, wherein a difference of thickness of the second IR control layer and the first IR control layer is no greater than 100 nanometers, and the difference of visible light transmission (VLT) of the first composite film and the second composite film is at least 20%.

3. The plurality of monolithic films of claim 1, wherein the first IR control layer is directly contacted on both major surfaces with the first encapsulating layer and the second encapsulating layer.

4. The plurality of monolithic films of claim 1, wherein the second IR control layer comprises a nitride.

5. The plurality of monolithic films of claim 1, wherein any of the second IR control layer comprises a metal nitride.

6. The plurality of monolithic films of claim 1, wherein the second IR control layer comprises molybdenum (Mo), nickel (Ni), tin (Sn), zirconia (Zr), nickel chromium (NiCr), tin zinc (SnZn), or combinations thereof.

7. The plurality of monolithic films of claim 1, wherein the second IR control layer comprises niobium nitride (NbN), titanium nitride (TiN), chromium nitride (CrN), tantalum nitride (TaN),), scandium nitride (ScN), yttrium nitride (YN), vanadium nitride (VN), Molybdenum nitride (MoN), zirconia nitride (ZrN), nickel chromium nitride (NiCrN), tin zinc nitride (SnZnN), hafnium nitride (HfN), or any combination thereof.

8. The plurality of monolithic films of claim 1, wherein the second IR control layer comprises niobium nitride and/or titanium nitride.

9. The plurality of monolithic films of claim 1, wherein the second IR control layer consists essentially of a metal nitride.

10. The plurality of monolithic films of claim 1, wherein the second IR control layer has a thickness of at least about 1 nanometers.

11. The plurality of monolithic films of claim 1, wherein the second IR control layer has a thickness of no greater than about 1000 nanometers.

12. The plurality of monolithic films of claim 1, wherein the second IR control layer has a thickness in a range from about 1 nanometers to about 200 nanometers.

13. The plurality of monolithic films of claim 1, wherein a ratio of the thickness of the second IR control layer to the first IR control layer is at least about 0.25.

14. The plurality of monolithic films of claim 1, wherein a ratio of the thickness of the second IR control layer to the first IR control layer is no greater than 10.

15. The plurality of monolithic films of claim 1, wherein a ratio of the thickness of the second IR control layer to the first IR control layer is in a range of from about 0.25 to about 3.

16. The plurality of monolithic films of claim 1, wherein the second IR control layer has a nitrogen content of at least about 1 atomic %.

17. The plurality of monolithic films of claim 1, wherein the second IR control layer has a nitrogen content of no greater than about 60 atomic %.

18. The plurality of monolithic films of claim 1, wherein the second IR control layer has a nitrogen content in a range of 1 atomic % to 50 atomic %.

19. The plurality of monolithic films of claim 1, wherein the second IR control layer comprises a compound according to the formula $NbN_x$, where x is from 0 to 1.5.

20. The plurality of monolithic films of claim 1, wherein the second IR control layer is a substantially continuous layer.

* * * * *